(12) United States Patent
Chen et al.

(10) Patent No.: US 6,671,621 B2
(45) Date of Patent: Dec. 30, 2003

(54) SYSTEM AND METHOD OF A GPS CONTROL SYSTEM WITH COMMUNICATION FUNCTION

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 0 days.

(21) Appl. No.: 10/103,706

(22) Filed: Mar. 25, 2002

(65) Prior Publication Data

US 2003/0182058 A1 Sep. 25, 2003

(51) Int. Cl.$^7$ .................. H04Q 7/20; G01C 21/34
(52) U.S. Cl. .................. 701/213; 455/456; 455/408; 455/33.4; 455/89; 455/3.02; 342/357.06
(58) Field of Search .................. 701/213, 207, 701/200, 208, 212, 209; 340/990, 995, 988; 455/456, 12.1, 414, 422, 412, 445, 408, 428, 560, 561, 3.02, 33.4, 541, 89; 342/357.06

(56) References Cited

U.S. PATENT DOCUMENTS

| | | | | |
|---|---|---|---|---|
| 2002/0086680 A1 | * | 7/2002 | Hunzinger | 455/456 |
| 2002/0099501 A1 | * | 7/2002 | Hilleary | 701/207 |
| 2002/0164995 A1 | * | 11/2002 | Brown et al. | 455/456 |
| 2002/0198004 A1 | * | 12/2002 | Heie et al. | 455/456 |
| 2003/0008661 A1 | * | 1/2003 | Joyce et al. | 455/456 |
| 2003/0022675 A1 | * | 1/2003 | Mergler | 455/456 |
| 2003/0028318 A1 | * | 2/2003 | Kaji et al. | 701/209 |
| 2003/0036842 A1 | * | 2/2003 | Hancock | 701/200 |
| 2003/0040272 A1 | * | 2/2003 | Lelievre et al. | 455/3.06 |
| 2003/0096621 A1 | * | 5/2003 | Jana et al. | 455/456 |

* cited by examiner

Primary Examiner—Thomas G. Black
Assistant Examiner—Tuan C To
(74) Attorney, Agent, or Firm—Bacon & Thomas, PLLC

(57) ABSTRACT

A GPS control system is disclosed, which is installed in a vehicle. The GPS control system will select a proper base station to provide communications, so the communication quality is improved and the communication costs are reduced. A current location coordinate of the vehicle, and an information database for the base stations are two factors for selecting the proper base station.

6 Claims, 8 Drawing Sheets

20

| main rectangle coordinates 21 | sub-rectangle rectangle coordinates 22 | base station contact information 23 | regions 24 |
|---|---|---|---|
| [(Xa1, Ya1), (Xa2, Ya2)] | [(Xa11, Ya11), (Xa21, Ya21)],[(Xa12, Ya12), (Xa22, Ya22)] • • • | 818-12345678 | A |
| [(Xb1, Yb1), (Xb2, Yb2)] | [(Xb11, Yb11), (Xb21, Yb21)] • • • • | 212-56781234 | B |
| [(Xc1, Yc1), (Xc2, Yc2)] | [(Xc11, Yc11), (Xc21, Yc21)] • • • • | 515-12345678 | C |
| • • • • | • • • • • • • • • • • | • • • • • • • • | • • |

| SerialNo | UnitID | Longitude | Latitude | Velocity | Altitude | Source | Date |
|---|---|---|---|---|---|---|---|
| 1 | YL000168 | 122.87215405 | 24.25364393 | 58 | 141.78 | 3 | 2001/05/20 AM 08:00:00 |
| 2 | YL000168 | 122.87155932 | 24.25302743 | 53 | 142.92 | 3 | 2001/05/20 AM 08:00:02 |
| 3 | YL000168 | 122.87105569 | 24.25281085 | 63 | 142.98 | 3 | 2001/05/20 AM 08:00:04 |
| 4 | YL000168 | 122.87054748 | 24.25261261 | 63 | 142.17 | 3 | 2001/05/20 AM 08:00:06 |
| 5 | YL000168 | 122.87018422 | 24.25233587 | 57 | 142.86 | 3 | 2001/05/20 AM 08:00:08 |
| 6 | YL000168 | 122.86917582 | 24.25178239 | 64 | 143.24 | 3 | 2001/05/20 AM 08:00:10 |
| 7 | YL000168 | 122.86855591 | 24.25185745 | 78 | 144.86 | 3 | 2001/05/20 AM 08:00:12 |
| 8 | YL000168 | 122.86760248 | 24.25198923 | 66 | 146.75 | 3 | 2001/05/20 AM 08:00:14 |
| 9 | YL000168 | 122.86684732 | 24.25182593 | 73 | 147.56 | 3 | 2001/05/20 AM 08:00:16 |
| 10 | YL000168 | 122.86626748 | 24.25145924 | 71 | 149.71 | 3 | 2001/05/20 AM 08:00:18 |
| 11 | YL000168 | 122.86601767 | 24.25109942 | 73 | 151.31 | 3 | 2001/05/20 AM 08:00:20 |
| 12 | YL000168 | 122.86571057 | 24.25078258 | 70 | 150.29 | 3 | 2001/05/20 AM 08:00:22 |
| 13 | YL000168 | 122.86503734 | 24.25055110 | 74 | 148.77 | 3 | 2001/05/20 AM 08:00:24 |
| 14 | YL000168 | 122.86436756 | 24.25035573 | 69 | 145.26 | 3 | 2001/05/20 AM 08:00:26 |
| 15 | YL000168 | 122.86389601 | 24.25058605 | 61 | 144.62 | 3 | 2001/05/20 AM 08:00:28 |
| 16 | YL000168 | 122.86328753 | 24.25045256 | 63 | 144.70 | 3 | 2001/05/20 AM 08:00:30 |
| 17 | YL000168 | 122.85939256 | 24.24823062 | 68 | 144.25 | 3 | 2001/05/20 AM 08:00:32 |
| 18 | YL000168 | 122.85877893 | 24.24800889 | 63 | 143.88 | 3 | 2001/05/20 AM 08:00:34 |
| 19 | YL000168 | 122.85827759 | 24.24774246 | 66 | 144.18 | 3 | 2001/05/20 AM 08:00:36 |
| 20 | YL000168 | 122.85769088 | 24.24738895 | 62 | 144.46 | 3 | 2001/05/20 AM 08:00:38 |

| main rectangle coordinates 21 | sub-rectangle rectangle coordinates 22 | base station contact information 23 | regions 24 |
|---|---|---|---|
| [(Xa1, Ya1), (Xa2, Ya2)] | [(Xa11, Ya11), (Xa21, Ya21)],[(Xa12, Ya12), (Xa22, Ya22)]····· | 818-12345678 | A |
| [(Xb1, Yb1), (Xb2, Yb2)] | [(Xb11, Yb11), (Xb21, Yb21)] ····· | 212-56781234 | B |
| [(Xc1, Yc1), (Xc2, Yc2)] | [(Xc11, Yc11), (Xc21, Yc21)] ····· | 515-12345678 | C |
| ···· | ········· | ········· | ·· |

Fig. 6

| sub-rectangle rectangle coordinates 22 | base station contact information 23 | regions 24 |
|---|---|---|
| [(Xa11, Ya11), (Xa21, Ya21)] | 818-12345678 | A |
| [(Xa12, Ya12), (Xa22, Ya22)] | 818-12345678 | A |
| ···· | ···· | ·· |
| [(Xb11, Yb11), (Xb21, Yb21)] | 212-56781234 | B |
| [(Xb12, Yb12), (Xb22, Yb22)] | 212-56781234 | B |
| ···· | ···· | ·· |

SYSTEM AND METHOD OF A GPS CONTROL SYSTEM WITH COMMUNICATION FUNCTION

BACKGROUND OF THE INVENTION

1. Field of the Invention

The present invention relates to a system and method of a GPS control system with communication functionality and, more particularly, to contacting different base stations in different areas to obtain status updates.

2. Description of Related Art

A vehicle with a conventional global positioning system needs receive a global positioning satellite signal at predetermined time intervals (1, 2 . . . or 5 sec, etc.) to obtain the current longitude/latitude location of the vehicle, the velocity of the vehicle, altitude, etc.

Please refer to FIG. 1. FIG. 1 illustrates data content recorded by a prior art GPS recorder. Typically, the application of information as applied to a GPS control system and an electronic map operate together in a coordinated fashion. When an emergency condition arises (such as a break down), the user will generally need to contact a service center via a wireless device (such as a mobile phone) to contact the base station. Contact may be actively done by the driver, or automatically by the GPS control system. Since the location of the vehicle may vary, the appropriate base station will vary as well. Therefore, it is necessary to provide a method or system that selects a proper base station to improve the communication quality and to reduce communication costs.

SUMMARY OF THE INVENTION

The object of the present invention is to provide a method for providing communication between a GPS control system and a base station, for a system that is installed in a vehicle. When the GPS control system needs to contact the base station, the present invention ensures that a proper base station is selected to improve the communication quality and to reduce communication costs.

Another object of the present invention is to provide a method for quickly searching a proper base station. According to an embodiment of the present invention, location information for various regions is stored in an information database. The information database utilizes at least one rectangle to describe each region, and each region includes two location coordinates to define the rectangle. Searching speed of an appropriate base station is thus improved.

To achieve these objectives, the method of the present invention includes the following steps:

Step A: obtaining a current location coordinate of the vehicle;

Step B: searching contact information for a related base station according to the current location coordinate of the vehicle, the GPS control system including an information database, the information database recording location information for a plurality of regions, and contact information for a plurality of base stations associated with the plurality of regions; and Step C: setting a searched base station as a contact base station.

Other objects, advantages, and novel features of the invention will become more apparent from the following detailed description when taken in conjunction with the accompanying drawings.

BRIEF DESCRIPTION OF THE DRAWINGS

FIG. 1 illustrates data content recorded by a prior art GPS recorder.

FIG. 5 shows a first embodiment of an information database of the present invention.

FIG. 6 shows a second embodiment of an information database of the present invention.

DETAILED DESCRIPTION OF THE PREFERRED EMBODIMENT

Figure 2:
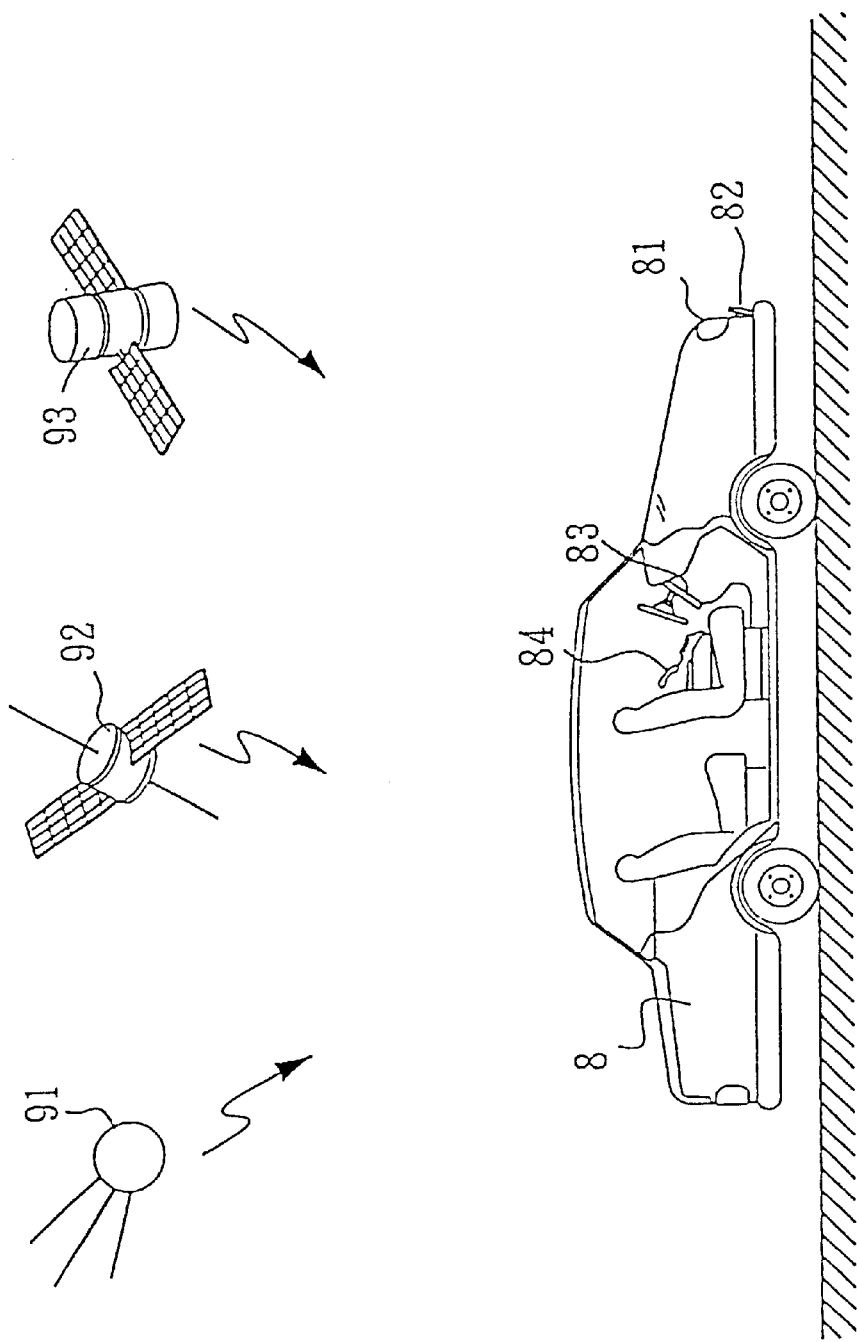
FIG. 2 is an application schematic drawing of an embodiment of the present invention.

Please refer to FIG. 2. FIG. 2 is an application schematic drawing of an embodiment of the present invention. In this embodiment, a GPS control system 10 is installed in a vehicle 8 (such as a commercial vehicle, a wagon, a truck, or other automotive vehicle). The vehicle comprises a headlight 81, a fog lamp 82, a multimedia system 83 that may include an audio device 831, a video device 832 etc., and a wireless communication device 84 (such as a mobile phone).

Figure 3:
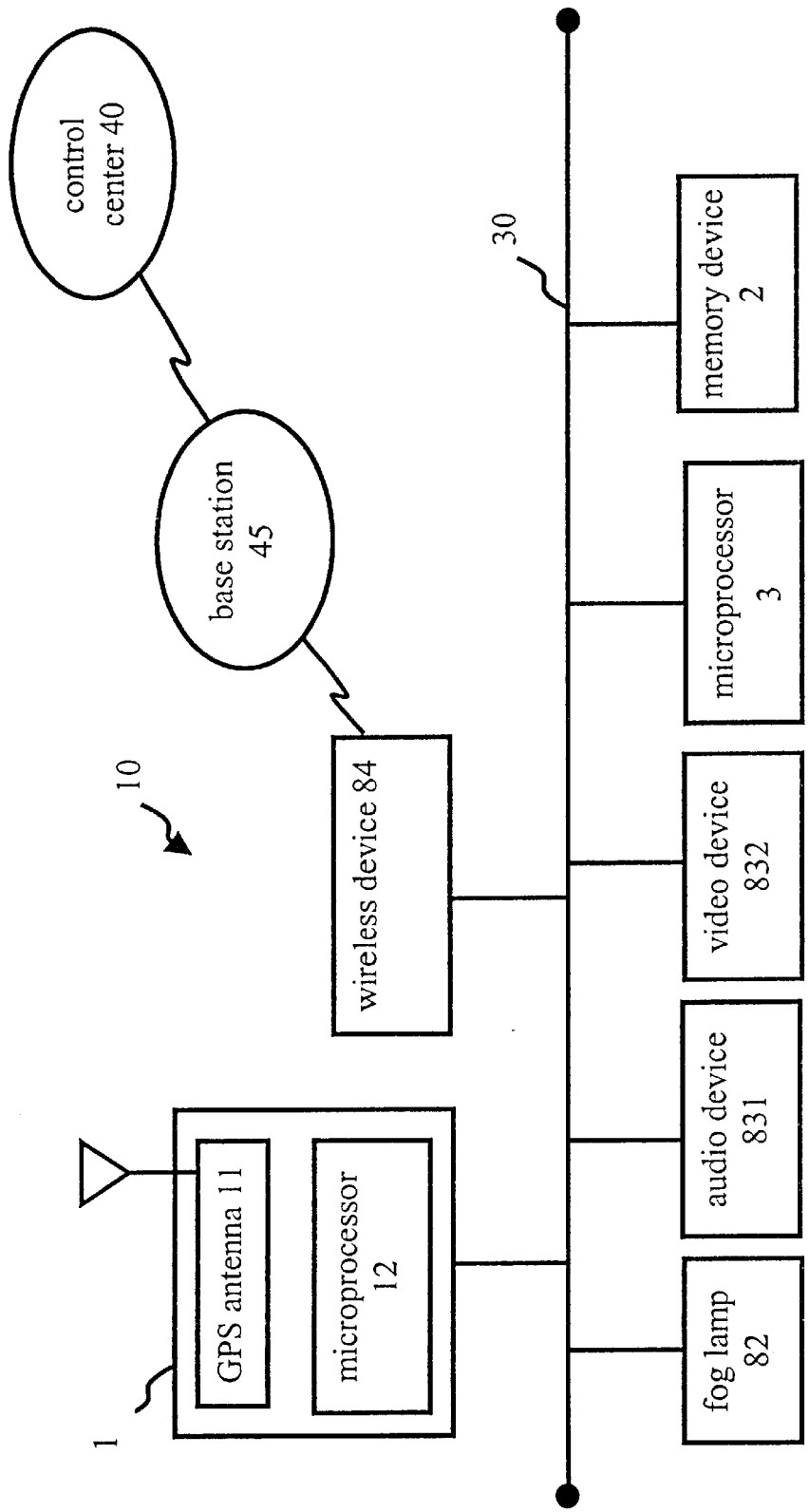
FIG. 3 is a function block drawing of an embodiment of the present invention.

Please refer to FIG. 3. FIG. 3 is a function block drawing of an embodiment of the present invention. The above-mentioned devices are connected respectively to a microprocessor 3 via a bus 30. The vehicle 8 further comprises a GPS device 1 and a memory device 2 connected to the bus 30. The GPS control system 10 is able to communicate with a base station via the wireless device 84. When it is necessary, the base station 45 can send a signal from the GPS control system 10 to a control center 40. The base station 45 is taken as a relay station, therefore, it is possible that there are numerous base stations, which are dispersed over various locations to receive a signal. The main characteristic of the present invention is to be able to select a proper base station according to a location of the vehicle 8, and hence to improve the communication quality and to reduce communication costs.

Figure 4:
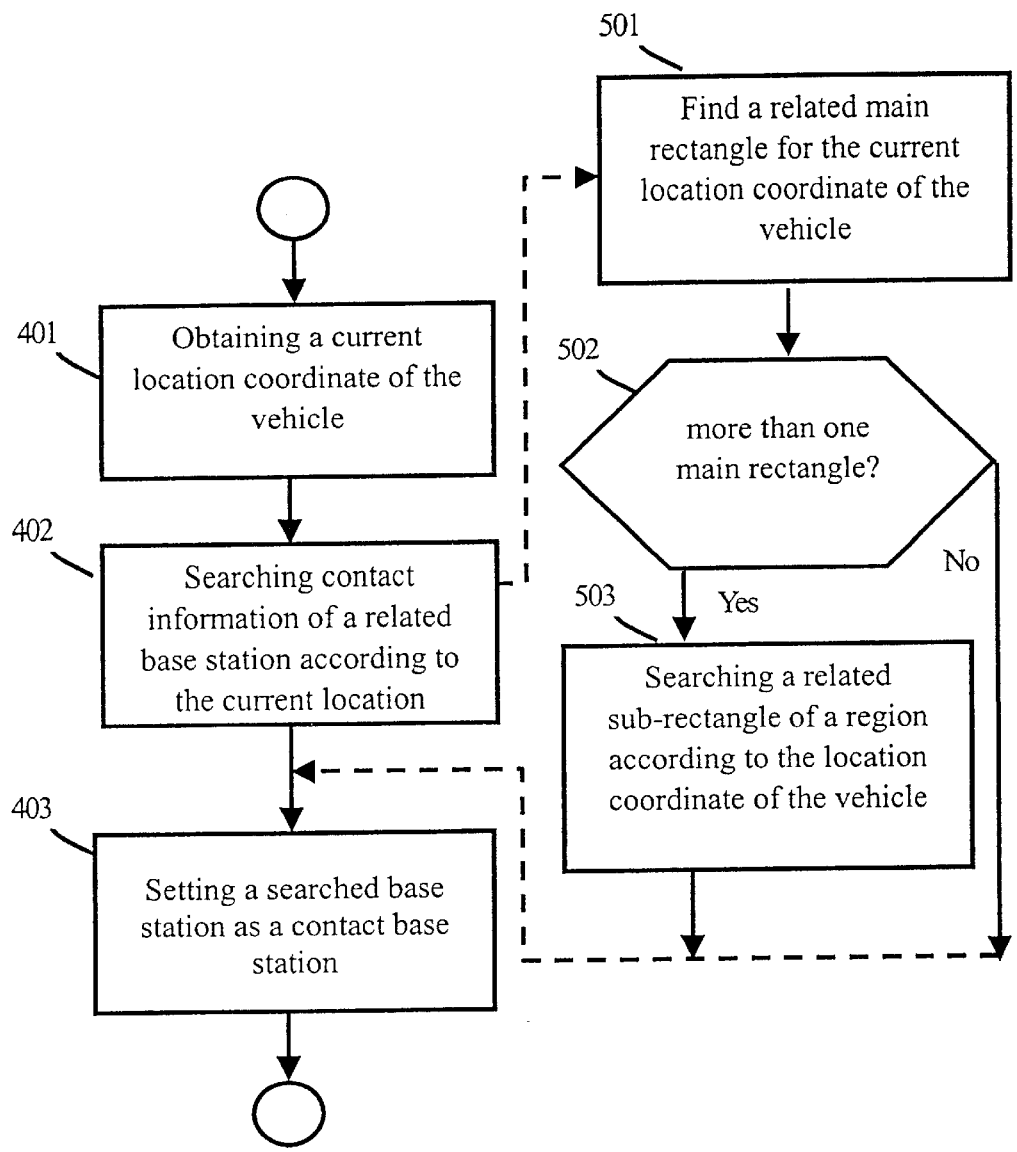
FIG. 4 is a flow chart of an embodiment of the present invention.

Please refer to FIG. 4. FIG. 4 is a flow chart of the embodiment of the present invention. Before the wireless device 84 communicates with the base station 45, a process according to the flow chart of FIG. 4 is performed to select a proper base station for the wireless device 84. Of course, the flow chart can be repeatedly performed at predetermined intervals, such as every 10 minutes. The steps include:

Step 401: obtaining a current location coordinate of the vehicle 8. A GPS antenna 11 of the GPS device 1 receives at least three global positioning satellite signals 91, 92 and 93 (FIG. 2), and the microprocessor 12 performs calculations to obtain global positioning information, which includes a longitude value and a latitude value (i.e. the location coordinate of the vehicle 8) according to the global positioning satellite signals 91, 92 and 93.

Step 402: searching contact information of a related base station according to the current location coordinate of the vehicle 8. This step can be performed by any of a variety of methods, but it should simply result in finding the base station base that is closest to the location coordinate of the vehicle 8. However, sometimes the closest base station is not the best station. As an example, in the United States, if the vehicle is in New Jersey and the closest base station is in New York City, the best base station should be a base station in New Jersey because the associated communication costs will be cheaper.

Steps 501~Step 503 explain an embodiment of step 402. Please refer to FIG. 5, FIG. 6 and FIG. 7.

FIG. 5 shows a first embodiment of an information database 20 of the present invention. An information database 20 includes a column of main rectangle coordinates 21, a column of sub-rectangle rectangle coordinates 22, a column of base station contact information 23 and a column of regions 24.

Figure 7:
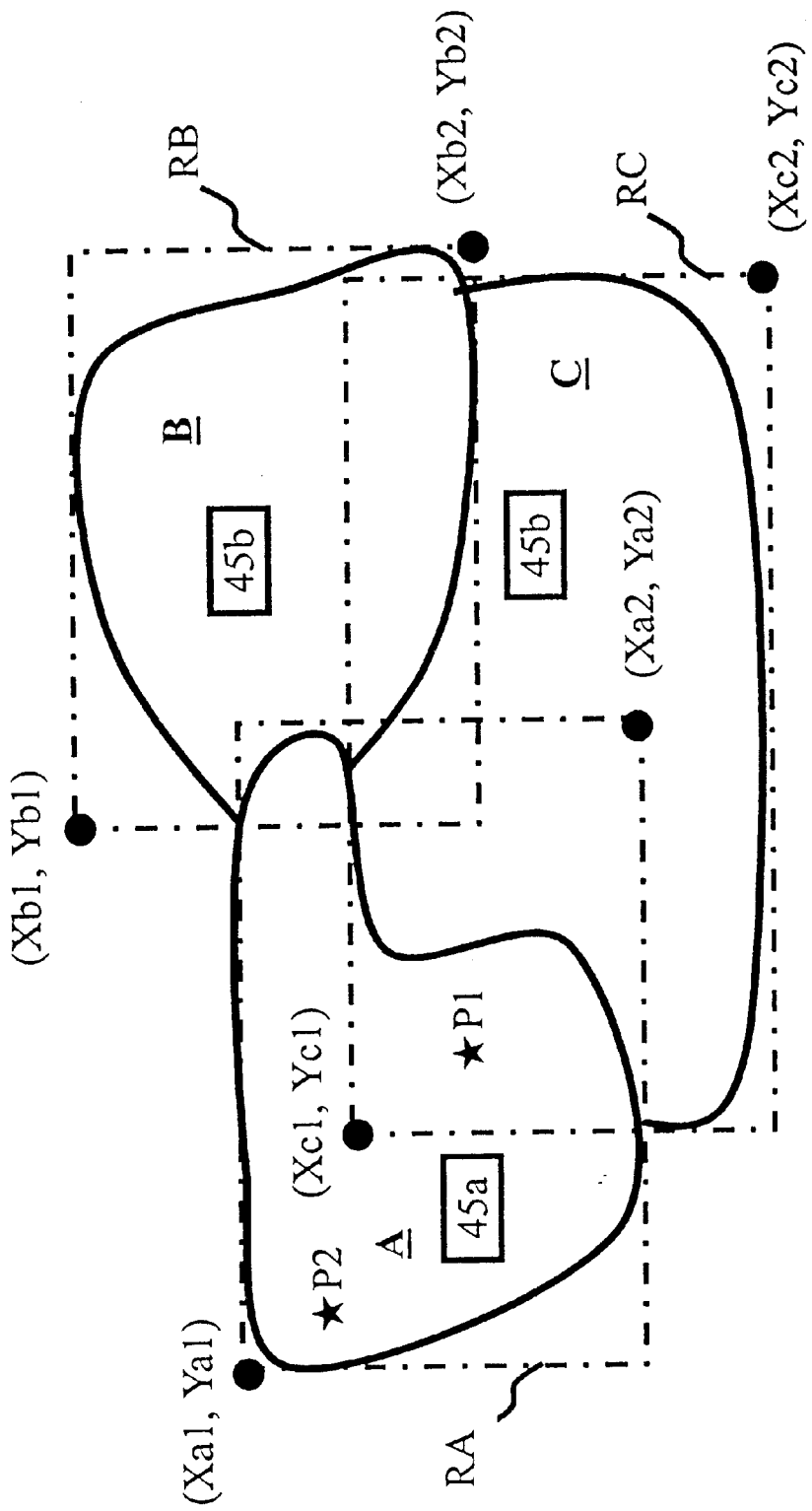
FIG. 7 illustrates the present invention utilizing a main rectangle to describe a location of each region of the present invention.

FIG. 7 shows the present invention utilizing a main rectangle to describe a location for each region. FIG. 7 dhows three regions, region A, region B and region C. Each region is managed by a related base station, such as a base station 45a, a base station 45b and a base station 45c. Furthermore, each region is contained within a related main rectangle, such as a main rectangle RA, a main rectangle RB, and a main rectangle RC. Location information of each main rectangle includes two location coordinates for defining the rectangle. Taking the region A as an example, the main rectangle RA is used for describing the extents of region A, and the main rectangle RA is defined by (Xa1, Ya1) and (Xa2, Ya2). The column of main rectangle coordinates 21 is used for recording the two location coordinates of the main rectangle.

However, it is often not sufficient to describe one region by a main rectangle. For example, when the vehicle 8 is at a location P1 and the location P1 is within a common region of the main rectangle RA and the main rectangle RC. Hence, when the region common to the main rectangle RA and main rectangle RC is too large, the GPS control system 10 cannot precisely describe the location of the vehicle 8 with only one main rectangle.

Figure 8:
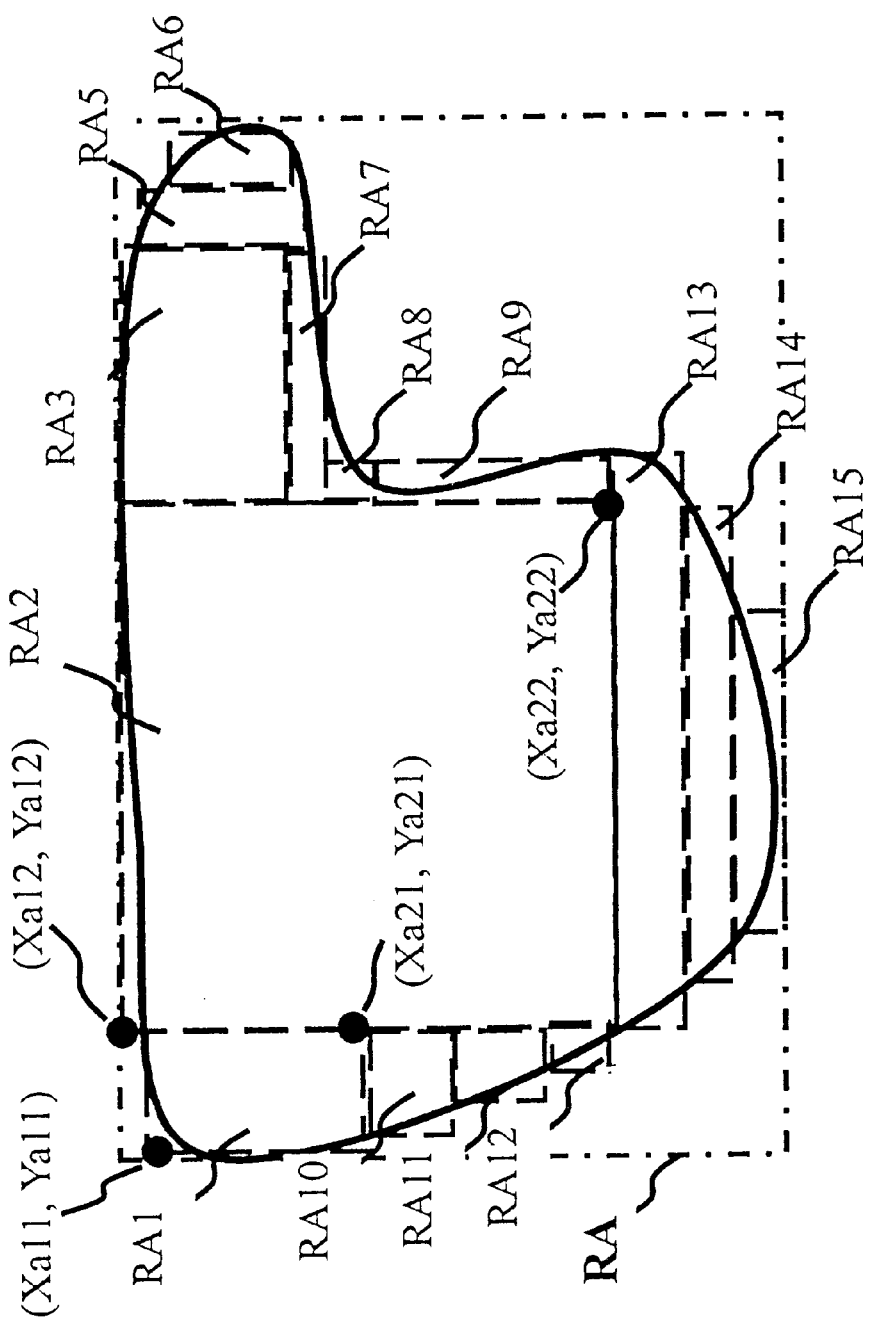
FIG. 8 is a schematic drawing of a first embodiment utilizing a sub-rectangle to describe a location of a region.

FIG. 8 is a schematic drawing of the first embodiment utilizing a sub-rectangle to describe a location of a region. Again taking the region A as an example, as shown in FIG. 8, there are a sub-rectangle RA-1, a sub-rectangle RA-2, a sub-rectangle RA-3 etc. Similarly, location information of each rectangle includes two location coordinates for defining the rectangle. Taking the sub-rectangle RA-1 as an example, the sub-rectangle RA-1 is defined by (Xa11, Ya11) and (Xa21, Ya21). The column of sub-rectangle coordinates 22 is used for recording the two location coordinates of the sub-rectangle.

The contact information of the related base station 23 is telephone number.

Step 501: Searching information database to find a related main rectangle for the current location coordinate of the vehicle 8.
Step 502: Is the current location coordinate of the vehicle 8 in more than one main rectangle? If it is, continue to step 503.

For example, if the location coordinate of the vehicle 8 is at position P1, which is contained by both the main rectangle RA and the main rectangle RC, the GPS control system 10 needs to perform step 503. But, if the location coordinate of the vehicle 8 is at position P2, which is only contained by the main rectangle RA, the GPS control system 10 does not need to perform step 503.
Step 503: Searching a related sub-rectangle of a region according to the location coordinate of the vehicle 8.

For example, if the location coordinate of the vehicle 8 is at the position P1, the GPS control system 10 searches a related column of the sub-rectangle coordinate 22 of a region. The smaller sub-rectangle can provide a more precise location, but it also requires higher data storage costs.
Step 403: Setting a searched base station as a contact base station. The contact information of the contact base station is the contact information of the base station managing the searched region.

The base station found in Step 402 will manage signal transmission between the vehicle 8 and the control center. For example, the contact information of the base station 23 is "818-12345678".

The above-mentioned embodiment may have following variations.

FIG. 6 shows a second embodiment of an information database of the present invention. In this embodiment, the information database 20 does not include the column of main rectangle coordinates 21. The GPS control system 10 searches the location of the vehicle directly from the column of sub-rectangles 22. However, this method requires that more time is spent in searching for an appropriate base station.

Figure 9:
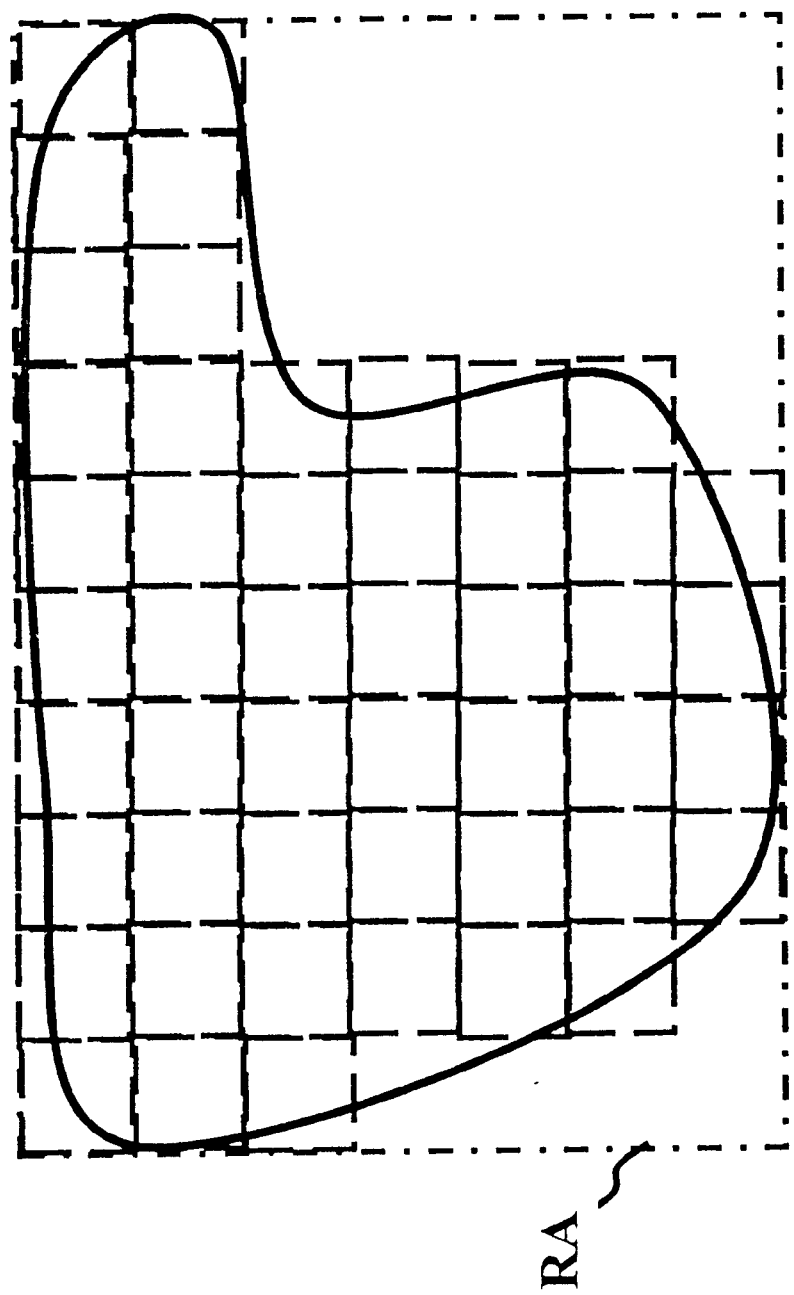
FIG. 9 is a schematic drawing of a second embodiment utilizing a sub-rectangle to describe a location of a region.

FIG. 9 is a schematic drawing of the second embodiment utilizing a sub-rectangle to describe a location of a region. The size of each sub-rectangle (shown in dotted lines) is identical, so it is easy for the computer to generate each sub-rectangle. However, this manner also requires a lot of searching time. The GPS control system 10 can execute a predetermined algorithm to merge sub-rectangles of the same size, as shown in FIG. 8.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A method for providing communications between a GPS control system and a base station, the GPS control system installed in a vehicle and obtaining location information updates from the base station, the method comprising:

Step A: obtaining a current location coordinate of the vehicle;

Step B: searching for contact information of a related base station according to the current location coordinate of the vehicle, the GPS control system installed in said vehicle comprising an information database, the information database recording location information of a plurality of regions and contact information of a plurality of base stations related to the plurality of regions, said contact information of said plurality of base stations including telephone numbers of said plurality of base stations, and said step of searching for contact information including a search of said telephone numbers based on the location coordinate of the vehicle; and Step C: setting a base station selected as a result of a search of said telephone numbers as a default contact base station.

2. The method of claim 1 wherein the location information of each region stored in the information database utilizes at least one rectangle to describe each region, each region including two location coordinates for defining the rectangle.

3. The method of claim 1 wherein the location information of each region utilizes a main rectangle substantially containing the region and a plurality of sub-rectangles describing each region, each region including at least two pairs of location coordinates for defining the main rectangle and the sub-rectangle, respectively.

4. A GPS control system with communication functionality for a vehicle, the GPS control system adapted to receive a global positioning satellite signal to update location information of the vehicle and to contact a base station, the GPS control system comprising:

a global positioning satellite receiver for receiving the global positioning satellite signal;

a memory device for storing at least one information database, the information database recording location information of a plurality of regions and contact information of a plurality of base stations related to the plurality of regions, said contact information including telephone numbers of said plurality of base stations;

a wireless communication device; and a microprocessor connected to the memory device for obtaining a current location coordinate for the vehicle from the memory device and selecting a related region for the location coordinate according to the information database to obtain contact information, including a telephone number of a related selected base station, said telephone number being obtained from a search of said telephone numbers according to said current location coordinate;

wherein the GPS control system sets the selected base station having said telephone number as a default contact base station for the wireless device.

5. The GPS control system of claim 4 wherein the location information of each region stored in the information database utilizes at least one rectangle to describe each region, each region including two location coordinates for defining the rectangle.

6. The GPS control system of claim 4 wherein the location information of each region utilizes a main rectangle substantially containing the region and a plurality of sub-rectangles describing each region, each region including two pairs of location coordinates t for defining the main rectangle and the sub-rectangle, respectively.

* * * * *